United States Patent
Chan et al.

(10) Patent No.: US 11,991,185 B2
(45) Date of Patent: May 21, 2024

(54) METHOD FOR SECURE DATA TRANSMISSION AND SYSTEM USING THE SAME

(71) Applicant: BlackBear (Taiwan) Industrial Networking Security Ltd., Hsinchu (TW)

(72) Inventors: Yuan Chen Chan, Hsinchu (TW); Po-Chih Hsu, Changhua County (TW); Chun-Hsien Tsai, Hsinchu County (TW)

(73) Assignee: BlackBear (Taiwan) Industrial Networking Security Ltd., Hsinchu (TW)

( * ) Notice: Subject to any disclaimer, the term of this patent is extended or adjusted under 35 U.S.C. 154(b) by 254 days.

(21) Appl. No.: 17/829,382

(22) Filed: Jun. 1, 2022

(65) Prior Publication Data
US 2023/0262069 A1 Aug. 17, 2023

Related U.S. Application Data

(60) Provisional application No. 63/309,646, filed on Feb. 14, 2022.

(51) Int. Cl.
*H04L 9/40* (2022.01)
*H04L 69/22* (2022.01)

(52) U.S. Cl.
CPC ............ *H04L 63/123* (2013.01); *H04L 69/22* (2013.01)

(58) Field of Classification Search
CPC ............ H04L 63/0236; H04L 63/0263; H04L 63/123; H04L 43/18; H04L 67/1095;
(Continued)

(56) References Cited

U.S. PATENT DOCUMENTS 5,703,562 A 12/1997 Nilsen
7,649,452 B2 1/2010 Zilberstein et al.
(Continued)

FOREIGN PATENT DOCUMENTS

| CA | 3126127 A1 * | 3/2022 | ......... H04L 63/1416 |
| EP | 3038314 | 6/2016 | |
| EP | 3038314 A1 * | 6/2016 | ........... H04L 1/1657 |

OTHER PUBLICATIONS

"Office Action of Taiwan Counterpart Application", issued on Dec. 20, 2022, p. 1-p. 9.
(Continued)

*Primary Examiner* — Sargon N Nano
(74) *Attorney, Agent, or Firm* — JCIPRNET

(57) ABSTRACT

A method for secure data transmission and a system using the same method are provided. The method includes: coupling a programmable logic device to a server; receiving a first data packet by the server; inputting the first data packet into a machine learning model to predict a protocol type and a command type of the first data packet by the server; verifying whether the protocol type and the command type are correct by the server; adding the first data packet to a data packet information set in response to the protocol type and the command type being correct by the server; generating a filtering rule according to the data packet information set and deploying the filtering rule in the programmable logic device by the server; and performing the secure data transmission according to the filtering rule by the programmable logic device.

13 Claims, 4 Drawing Sheets

(58) Field of Classification Search
CPC ......... H04L 69/08; H04L 69/22; G06N 20/00; G06N 3/0464; G06N 3/09; G06N 3/046
USPC .......................................................... 726/4
See application file for complete search history.

(56) References Cited

U.S. PATENT DOCUMENTS

| | | | |
|---|---|---|---|
| 7,721,048 B1 * | 5/2010 | Sendag | ................ G06F 12/128 |
| | | | 712/237 |
| 8,250,358 B2 | 8/2012 | Cheng | |
| 8,352,450 B1 | 1/2013 | Mraz et al. | |
| 8,353,022 B1 | 1/2013 | Menoher et al. | |
| 8,732,453 B2 | 5/2014 | Mraz et al. | |
| 8,776,254 B1 | 7/2014 | Mraz et al. | |
| 8,879,427 B2 | 11/2014 | Krumel | |
| 8,891,546 B1 | 11/2014 | Frenkel et al. | |
| 8,893,253 B2 | 11/2014 | Cianfrocca | |
| 9,088,539 B2 | 7/2015 | Mraz | |
| 9,088,558 B2 | 7/2015 | Curry et al. | |
| 9,178,908 B2 * | 11/2015 | Call | ................ H04L 63/1441 |
| 9,215,212 B2 * | 12/2015 | Reddy | ..................... G06F 3/048 |
| 9,306,953 B2 | 4/2016 | Mraz et al. | |
| 9,521,120 B2 | 12/2016 | Ferry | |
| 9,584,521 B2 | 2/2017 | Frenkel | |
| 9,729,507 B2 | 8/2017 | Fischer et al. | |
| 9,736,121 B2 | 8/2017 | Mraz et al. | |
| 9,749,011 B2 | 8/2017 | Kim et al. | |
| 9,762,536 B2 | 9/2017 | Frenkel et al. | |
| 9,847,972 B2 | 12/2017 | Frenkel et al. | |
| 9,853,918 B2 | 12/2017 | Mraz et al. | |
| 10,218,715 B2 | 2/2019 | Thomson et al. | |
| 11,159,546 B1 * | 10/2021 | Moore | ................ H04L 63/1466 |
| 11,611,488 B2 * | 3/2023 | Yoon | .................. H04L 41/0213 |
| 11,847,111 B2 * | 12/2023 | Manolache | ............ G06N 20/00 |
| 2002/0120865 A1 * | 8/2002 | Schwab | .................. H04L 69/08 |
| | | | 726/11 |
| 2004/0128545 A1 * | 7/2004 | Chakravarty | ....... H04L 63/0227 |
| | | | 726/11 |
| 2013/0010954 A1 | 1/2013 | Falk et al. | |
| 2017/0353368 A1 | 12/2017 | Blocher et al. | |
| 2020/0053048 A1 | 2/2020 | Frenkel | |
| 2020/0120071 A1 | 4/2020 | Wimmer et al. | |
| 2020/0259585 A1 | 8/2020 | Aust et al. | |
| 2020/0342153 A1 | 10/2020 | Staubly et al. | |
| 2021/0185072 A1 | 6/2021 | Andreu | |
| 2021/0243209 A1 * | 8/2021 | Ramani | ................... H04L 63/20 |
| 2023/0231869 A1 * | 7/2023 | Gamble | ............. H04L 63/1425 |
| | | | 726/23 |

OTHER PUBLICATIONS

"Search Report of Europe Counterpart Application", issued on Nov. 30, 2022, p. 1-p. 9.

* cited by examiner

METHOD FOR SECURE DATA TRANSMISSION AND SYSTEM USING THE SAME

CROSS-REFERENCE TO RELATED APPLICATION

This application claims the priority benefit of U.S. Provisional Patent Application Ser. No. 63/309,646, filed on Feb. 14, 2022. The entirety of the above-mentioned patent application is hereby incorporated by reference herein and made a part of this specification.

BACKGROUND

Technical Field

The disclosure is directed to a method for secure data transmission and a system using the same method.

Description of Related Art

In a system that requires secure data transmission, a filtering device may be deployed to block potentially unsecure data or malicious attacks from infiltrating the end device. In order to do so, the filtering device must utilize certain filtering rules to determine whether a data packet is safe to forward to the end device. The filtering rule may be created manually by an engineer who understands the knowledge about data which should be forwarded to the end device, but in some cases customized filtering rules may be required.

SUMMARY

The disclosure is directed to a method for secure data transmission and a system using the same method. The disclosure may generate a filtering rule for secure data transmission automatically.

The disclosure provides a system for secure data transmission, including a programmable logic device and a server. The server is coupled to the programmable logic device, wherein the server is configured to: receive a first data packet; input the first data packet into a machine learning model to predict a protocol type and a command type of the first data packet; verify whether the protocol type and the command type are correct; add the first data packet to a data packet information set in response to the protocol type and the command type being correct; and generate a filtering rule according to the data packet information set and deploy the filtering rule in the programmable logic device. The programmable logic device performs the secure data transmission according to the filtering rule.

In one embodiment of the disclosure, the server generates the filtering rule by: obtaining, from the data packet information set, a plurality of data packets corresponding to the protocol type and the command type; obtaining, from the plurality of data packets, a plurality of feature values respectively corresponding to the plurality of data packets, wherein the plurality of feature values include at least one first feature value and at least one second feature value; selecting, from the at least one first feature value and the at least one second feature value, the at least one first feature value as a selected feature value in response to a first number of the at least one first feature value being greater than a second number of the at least one second feature value; and generating, according to the selected feature value, the filtering rule corresponding to the protocol type and the command type.

In one embodiment of the disclosure, the selected feature value includes at least one of the followings: an Internet protocol address, a media access control address, and a transmission control protocol port number.

In one embodiment of the disclosure, the filtering rule includes: discarding a second data packet corresponding to the protocol type and the command type in response to a feature value of the second data packet not matching with the selected feature value.

In one embodiment of the disclosure, the system further including a first gateway. The first gateway is coupled to the programmable logic device, wherein the first gateway receives the second data packet and forwards the second data packet to the programmable logic device.

In one embodiment of the disclosure, the first gateway is coupled to the server, wherein the first gateway receives the first data packet and mirrors the first data packet to the server.

In one embodiment of the disclosure, the first gateway converts the first data packet and the second data packet from a first communication protocol to a second communication protocol.

In one embodiment of the disclosure, the system further including a second gateway. The second gateway is coupled to the programmable logic device, wherein the second gateway receives a data packet from the programmable logic device via the secure data transmission and converts the data packet from the second communication protocol to the first communication protocol.

In one embodiment of the disclosure, the system further including a diagnosis device. The diagnosis device is coupled to the programmable logic device, wherein the diagnosis device receives the second data packet discarded by the programmable logic device and generates a report according to the second data packet.

In one embodiment of the disclosure, the machine learning model includes a convolutional neural network.

In one embodiment of the disclosure, the server verifies whether the protocol type and the command type are correct by: obtaining a first value from a first field in the first data packet, wherein the first field is associated with the protocol type; and determining the protocol type is correct in response to both the first value and a data length of the first data packet matching with the protocol type.

In one embodiment of the disclosure, the server verifies whether the protocol type and the command type are correct further by: obtaining a second value from a second field in the first data packet, wherein the second field is associated with the command type corresponding to the protocol type; and determining the command type is correct in response to the second value matching with the command type.

In one embodiment of the disclosure, the server generates the filtering rule in response to a number of data packets in the data packet information set being greater than a threshold.

The disclosure provides a method for secure data transmission, including: coupling a programmable logic device to a server; receiving a first data packet by the server; inputting the first data packet into a machine learning model to predict a protocol type and a command type of the first data packet by the server; verifying whether the protocol type and the command type are correct by the server; adding the first data packet to a data packet information set in response to the protocol type and the command type being correct by the server; generating a filtering rule according to the data packet information set and deploying the filtering rule in the programmable logic device by the server; and performing the secure data transmission according to the filtering rule by the programmable logic device.

In view of foregoing, the disclosure may verify whether a data packet can be used to create filtering rules according to the protocol type and the command type of the data packet. The disclosure may generate the filtering rules according to the data packet passing the verification and deploy the filtering rules on a PLD to perform secure data transmission.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
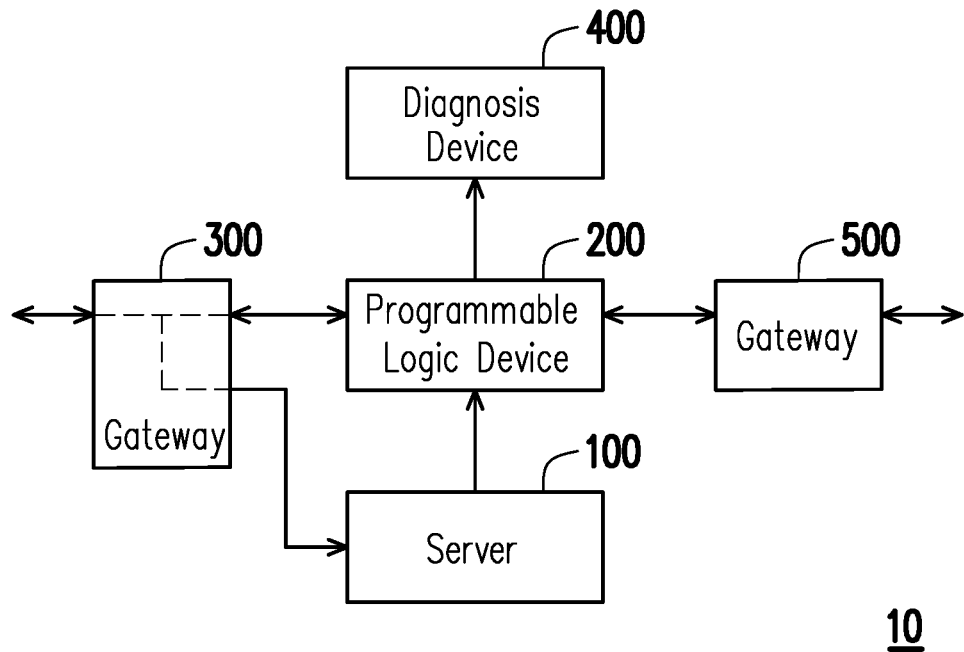
FIG. 1 illustrates a schematic diagram of system for secure data transmission according to an embodiment of the disclosure.

In order to make the disclosure more comprehensible, several embodiments are described below as examples of implementation of the disclosure. Moreover, elements/components/steps with the same reference numerals are used to represent identical or similar parts in the figures and embodiments where appropriate.

FIG. 1 illustrates a schematic diagram of system 10 for secure data transmission according to an embodiment of the disclosure. The system 10 may include a server 100, a programmable logic device (PLD) 200, a gateway (or a switch) 300, and a diagnosis device 400. In one embodiment, the system 10 may further include a gateway 500. The PLD 200 may communicatively connect to the server 100, the gateway 300, the diagnosis device 400, and the gateway 500. The system 10 may block potentially unsecure data or malicious attack from infiltrating an electronic device.

Figure 2:
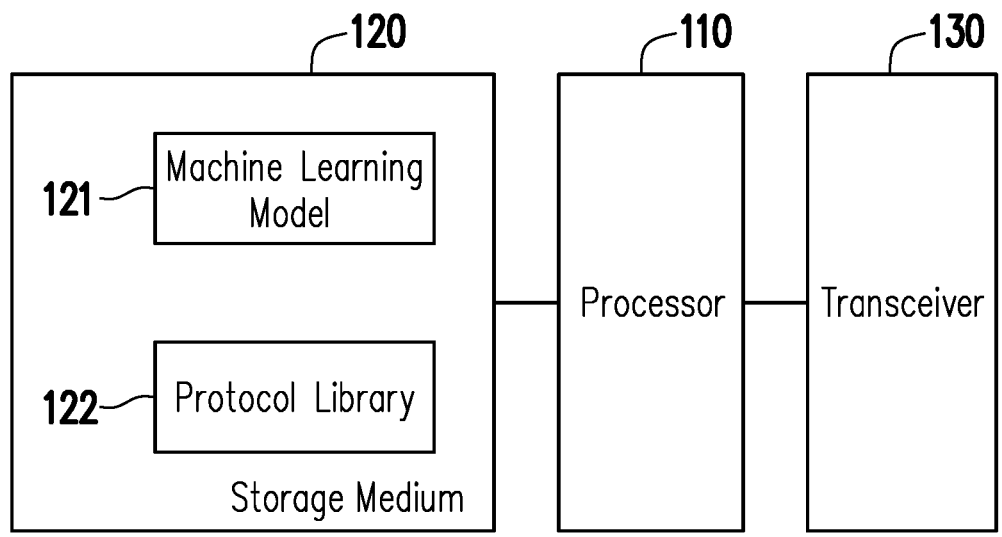
FIG. 2 illustrates a schematic diagram of server according to an embodiment of the disclosure.

FIG. 2 illustrates a schematic diagram of server 100 according to an embodiment of the disclosure. The server 100 may include a processor 110, a storage medium 120, and a transceiver 130.

The processor 110 may be a central processing unit (CPU), a micro control unit (MCU), a microprocessor, a digital signal processor (DSP), a programmable logic controller (PLC), an application specific integrated circuit (ASIC), a graphics processing unit (GPU), an image signal processor (ISP), an image processing unit (IPU), an arithmetic logic unit (ALU), a complex programmable logic device (CPLD), a FPGA, or other similar components or a combination of the foregoing components. The processor 110 may be coupled to the storage medium and the transceiver, and the processor may access and execute a plurality of modules or programs stored in the storage medium 120.

The storage medium 120 may be a random access memory (RAM), a read-only memory (ROM), a flash memory, a hard disk drive (HDD), a solid state drive (SSD), or similar components or a combination of the foregoing components. The storage medium 120 may store a plurality of modules or programs for the processor 110 to access, so that the processor 110 can perform various functions of the server 100. The storage medium 120 may store a machine learning model 121 and a protocol library 122 associated with protocol types and command types.

The transceiver 130 may be configured to transmit and receive signals in a wired or wireless manner. The transceiver 130 can also perform operations such as low noise amplifying, impedance matching, frequency mixing, up and down frequency conversion, filtering, amplification, and similar operations.

The gateway 300 (or the gateway 500) may include components necessary for performing the function of the gateway 300 (or the gateway 500), such as a processing unit (e.g., a processor), a communication unit (e.g., a transceiver or a communication chip), and a storage medium (e.g., RAM, ROM, HDD, or SSD). In one embodiment, the gateway 300 or the gateway 500 may convert a received data packet from a communication protocol to another communication protocol before forwarding the received data packet. For example, the gateway 300 or the gateway 500 may convert a data packet (e.g., data packet received from an external serial device) from a serial-based transmission protocol to an Ethernet-based protocol. For another example, the gateway 300 or the gateway 500 may convert a data packet (e.g., data packet received from the PLD 200) from the Ethernet-based protocol to the serial-based transmission protocol. In one embodiment the gateway 300 (or the gateway 500) may receive a data packet from an external electronic device (e.g., an end device) and may convert the received data packet from a communication protocol to another communication protocol (e.g., the communication protocol supported by the PLD 200 or the server 100) before the gateway 300 (or the gateway 500) forwards the data packet to the PLD 200 or server 100. In one embodiment, the gateway 300 (or the gateway 500) may receive a data packet from the PLD 200 and may convert the received data packet from a communication protocol to another communication protocol (e.g., the communication protocol supported by the external electronic device) before the gateway 300 (or the gateway 500) forwards the data packet to an external electronic device (e.g., an end device).

Referring to FIG. 1, the gateway 300 (or the gateway 500) may receive data packets and may forward the received data packets to the PLD 200. In one embodiment, the gateway 300 (or gateway 500) may convert the received data packets from a communication protocol to another communication protocol (e.g., Ethernet or Modbus) supported by the PLD 200 before forwarding the received data packets to the PLD 200. The operation modes of the system 10 may include a learning mode and a running mode. When the system 10 is in the learning mode, the gateway 300 may mirror the data packet forwarded to or from the PLD 200 to the server 100. In one embodiment, the gateway 300 may convert the received data packets from a communication protocol to another communication protocol supported by the server 100 before mirroring the received data packets to the server 100. When the system 10 is in the running mode, the gateway 300 may or may not stop mirroring the data packet to the server 100. The operation mode of the system 10 may be changed periodically or may be determined by the server 100.

The server 100 may deploy a new filtering rule on the PLD 200 or update the filtering rule stored in the PLD 200. If there is no filtering rule stored in the PLD 200 or the filtering rules stored in the PLD 200 are not updated yet, the server 100 may determine that the system 10 is in the learning mode. On the other hand, after the server 100 deploys the new filtering rule on the PLD 200 or updates the filtering rule stored in the PLD 200, the server 100 may determine that the system 10 is in the running mode. When the system 10 is in the learning mode, the PLD 200 may bypass the received data packet (e.g., data packet received from the gateway 300 or gateway 500) or may filter the received data packet according to old filtering rules. When the system 10 is in the running mode, the PLD 200 may filter the received data packet (e.g., data packet received from the gateway 300 or gateway 500) by the new filtering rule or the updated filtering rule. The data packet matching with the filtering rule may be forwarded by the PLD 200 and the data packet not matching with the filtering rule may be discarded by the PLD 200. In one embodiment, the data packet outputted from the PLD 200 may be encoded (by gateway 300, gateway 500, or a circuit) based on the media access control security (MACSec) protocol.

The diagnosis device 400 may be a security operation center (SOC) or may be a computing device communicatively connected to the SOC. The diagnosis device 400 may receive the data packet discarded by the PLD 200 and generate a report according to the received data packet. The diagnosis device 400 may output the report to a terminal device of a user so as to inform the user that an unsecure data transmission or malicious attack is taking place. In one embodiment, the diagnosis device 400 and the server 100 may be implemented by the same hardware equipment.

In one embodiment, when the system 10 is in the running mode, the gateway 300 may mirror the received data packet to the server 100, and the server 100 may analyze or filter the mirrored data packet according to the filtering rules generated by the server 100. If the mirrored data packet is not matched with the filtering rules, the server 100 may output a report to a terminal device of a user so as to inform the user that an unsecure data transmission or malicious attack is taking place. In one embodiment, the server 100 may determine to update the filtering rule for the PLD 200 if the mirrored data packet received by the server 100 is not matched with the filtering rules.

Figure 3:
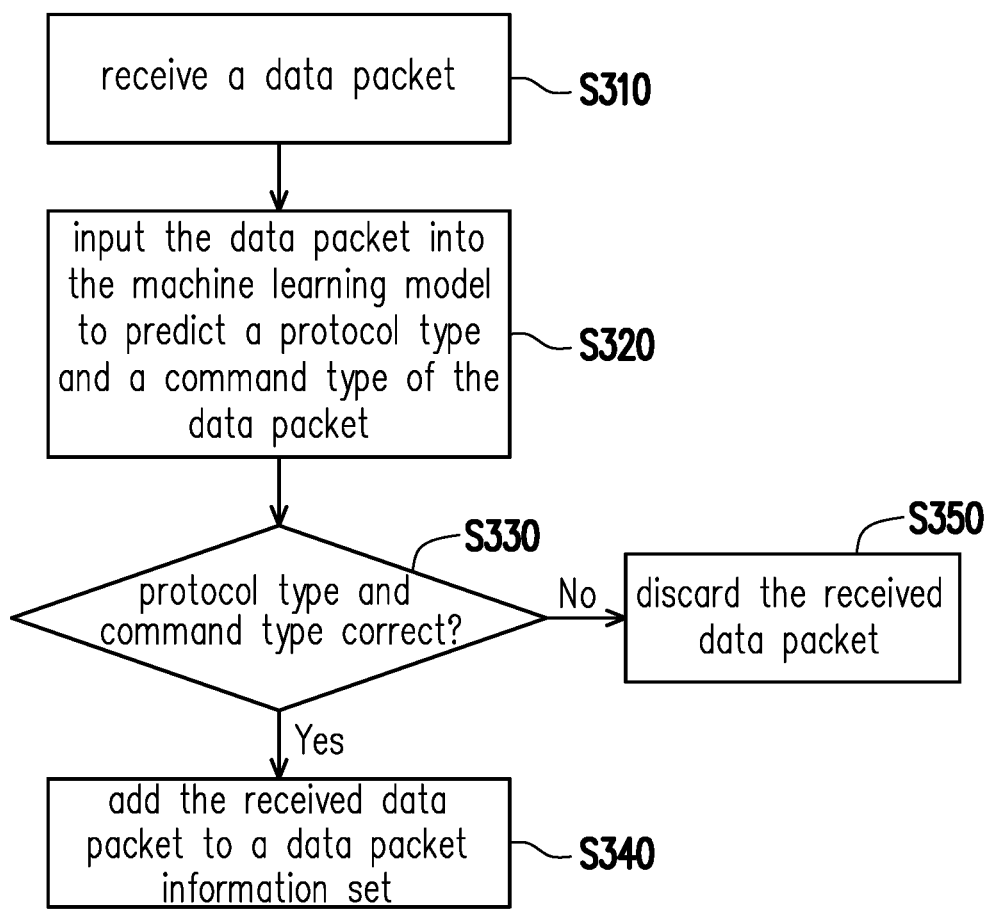
FIG. 3 illustrates a flowchart of screening a data packet for generating a filtering rule according to an embodiment of the disclosure.

FIG. 3 illustrates a flowchart of screening a data packet for generating a filtering rule according to an embodiment of the disclosure, wherein the steps of the flowchart may be implemented by the system 10 as shown in FIG. 1. It should be noted that, the filtering rule may be generated by the server 100 regardless of whether the operation mode of the system 10 is in the learning mode or in the running mode. In step S310, the server 100 may receive a data packet. The data packet may be forwarded to the PLD 200 by the gateway 300 and may be mirrored to the server 100 by the gateway 300. The gateway 300 may convert the data packet to a protocol supported by the PLD 200 and the server 100 before transmitting the data packet to the PLD 200 and the server 100.

In step S320, the processor 110 of the server 100 may input the data packet into the machine learning model 121 to predict a protocol type and a command type of the data packet. For an example, the protocol type may include a communication protocol such as Modbus and the command type may include a query command or a response command, but the disclosure is not limited thereto. The machine learning model 121 may be a convolutional neural network (CNN). In one embodiment, the machine learning model 121 may be pre-trained offline by the server 100 according to a training set, wherein the training set may include a plurality of data packets labeled with a protocol type and a command type.

In step S330, the processor 110 of the server 100 may verify whether the predicted protocol type and the predicted command type of the data packet are correct. If the protocol type and the command type of the data packet are correct, processing to step S340. If the protocol type and the command type of the data packet are not correct, processing to step S350.

The processor 110 may determine whether the protocol type and the command type are correct based on the protocol library 122, wherein the protocol library 122 may be a database recording the mapping relationship among the protocol type, the command type, and the at least one field of a data packet. Specifically, the processor 110 may obtain a value from a field in the data packet by referring to the protocol library 122, wherein the field is associated with the protocol type (and/or the command type corresponding to the protocol type). If the value matches with the corresponding protocol type (and/or the command type corresponding to the protocol type), the processor 110 may determine that the protocol type (and/or the command type corresponding to the protocol type) of the data packet is correct. If the value is not matched with the corresponding protocol type (and/or the command type corresponding to the protocol type), the processor 110 may determine that the protocol type (and/or the command type corresponding to the protocol type) of the data packet is not correct.

For example, the protocol library 122 may record that the protocol identifier of a Modbus packet is equal to "0" and corresponds to a specific field including byte 3 and byte 4, and the protocol library 122 may record that the reasonable data length of a Modbus packet is less than 253 bytes. Assuming that the machine learning model 121 predicts that a protocol type of a data packet received by the server 100 corresponds to the Modbus protocol, if the processor 110 obtains a value of "0" from byte 3 and byte 4 of the received data packet with size of 250 bytes, the processor 110 may determine that the predicted protocol type is correct in response to both of the obtained value and the data length of the data packet matching with the Modbus protocol.

In step S340, the processor 110 of the server 100 may add the received data packet (or the data packet information including a portion of the received data packet) to a data packet information set, wherein the data packet information set can be used to generate the filtering rule for the PLD 200. In step S350, the processor 110 may discard the received data packet. In one embodiment, the processor 110 may start generating the filtering rule according to the data packet information set in response to a number of data packets in the data packet information set being greater than a threshold.

Figure 4:
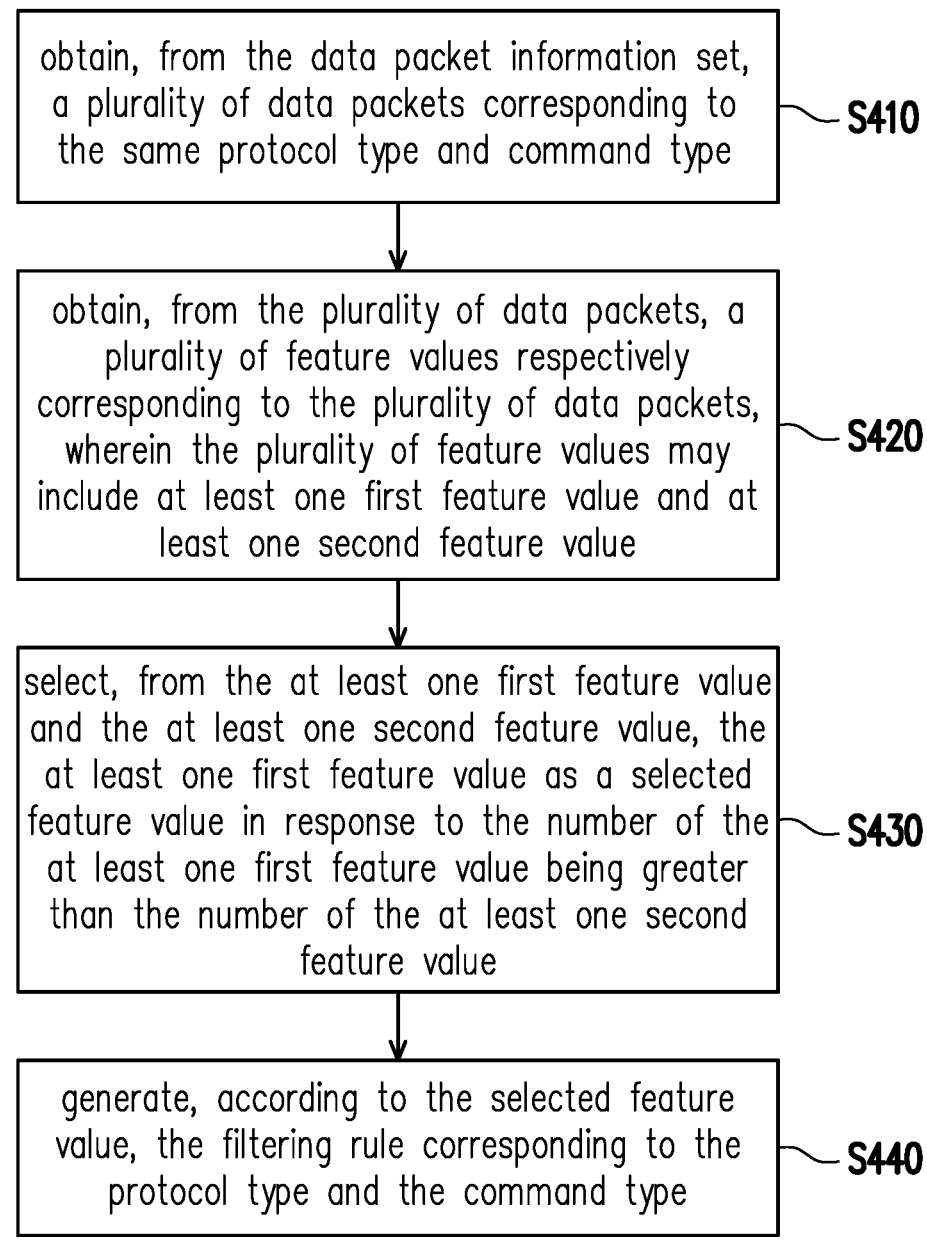
FIG. 4 illustrates a flowchart of generating a filtering rule according to an embodiment of the disclosure.

FIG. 4 illustrates a flowchart of generating a filtering rule according to an embodiment of the disclosure, wherein the steps of the flowchart may be implemented by the system 10 as shown in FIG. 1. In step S410, the processor 110 of the server 100 may obtain, from the data packet information set, a plurality of data packets corresponding to the same protocol type and command type. For example, the processor 110 may obtain, from the data packet information set, a plurality of data packets corresponding to the response command of the Modbus protocol.

In step S420, the processor 110 may obtain, from the plurality of data packets, a plurality of feature values respectively corresponding to the plurality of data packets, wherein the plurality of feature values may include at least one first feature value and at least one second feature value. In one embodiment, the feature values may be associated with an Internet protocol (IP) address, a media access control (MAC) address, a transmission control protocol (TCP) port number, a destination address, or a source address, but the disclosure is not limited thereto. For example, the processor 110 may obtain, from the plurality of data packets, a plurality of TCP port numbers respectively corresponding to the plurality of data packets, wherein the plurality of TCP port numbers may include multiple "port 21" and multiple "port 23".

In step S430, the processor 110 may select, from the at least one first feature value and the at least one second feature value, the at least one first feature value as a selected feature value in response to the number of the at least one first feature value being greater than the number of the at least one second feature value. For example, assuming that the plurality of TCP port numbers includes 120 "port 21" and 80 "port 23". The processor 110 may select, from the "port 21" and "port 23", "port 21" as the selected feature value in response to the number of "port 21" being greater than the number of "port 23". For another example, assuming that the plurality of TCP port numbers includes 100 "port 21", and 60 "port 23", and "port 53". The processor 110 may select, from the "port 21", "port 23", and "port 53", "port 21" as the selected feature value in response to the number of "port 21" being greater than both of the number of "port 23" and the number of "port 53".

In one embodiment, the plurality of feature values may only include the at least one first feature value. That is, all the plurality of feature values may be the same. For example, in step S420, the processor 110 may obtain, from the plurality of data packets, a plurality of TCP port number respectively corresponding to the plurality of data packets, wherein the plurality of TCP port number may only include multiple "port 21". In such cases, the at least one first feature value may be selected as the selected feature value automatically.

In one embodiment, the number of the at least one first feature value may be equal to the number of the at least one second feature value. In such cases, the processor 110 may select one of the at least one first feature value and the at least one second feature value as the selected feature value, or the processor 110 may select both the at least one first feature value and the at least one second feature value as the selected feature values.

In step S440, the processor 110 may generate, according to the selected feature value, the filtering rule corresponding to the protocol type and the command type. In the similar manner of FIG. 4, the processor 110 may generate filtering rules for each combination of protocol type and command type. Then, the processor 110 may transmit the filtering rule(s) to the PLD 200 to deploy the filtering rule(s) in the PLD 200. Accordingly, the PLD 200 may perform the secure data transmission according to the filtering rule(s). In one embodiment, the filtering rules may be transmitted from the processor 110 to the PLD 200 via a universal asynchronous receiver/transmitter (UART) interface, wherein the UART interface may be supported by the transceiver 130. In one embodiment, the filtering rules may be transmitted from the processor 110 to the PLD 200 along with an authorized password. The PLD 200 may determine to deploy the received filtering rules in response to the authorized password being verified by the PLD 200 successfully. That is, only an authorized person who knows the password can update the filtering rules of the PLD 200 by operating the server 100.

The PLD 200 may forward a received data packet corresponding to a protocol type and a command type in response to a feature value of the data packet matching with the selected feature value(s) indicated by the filtering rule, and the PLD 200 may discard a received data packet corresponding to a protocol type and a command type in response to a feature value of the data packet not matching with the selected feature value(s) indicated by the filtering rule. For example, the filtering rule may indicate that the data packet corresponding to Modbus protocol and response command can be forwarded by the PLD 200 if the TCP port of the data packet is equal to "port 21", and the data packet corresponding to Modbus protocol and response command can be discarded by the PLD 200 if the TCP port of the data packet is not equal to "port 21". For another example, the filtering rule may indicate that the data packet corresponding to Modbus protocol and response command can be forwarded by the PLD 200 if the TCP port of the data packet is equal to "port 21" or "port 23", and the data packet corresponding to Modbus protocol and response command can be discarded by the PLD 200 if the TCP port of the data packet is not equal to "port 21" or "port 23".

Figure 5:
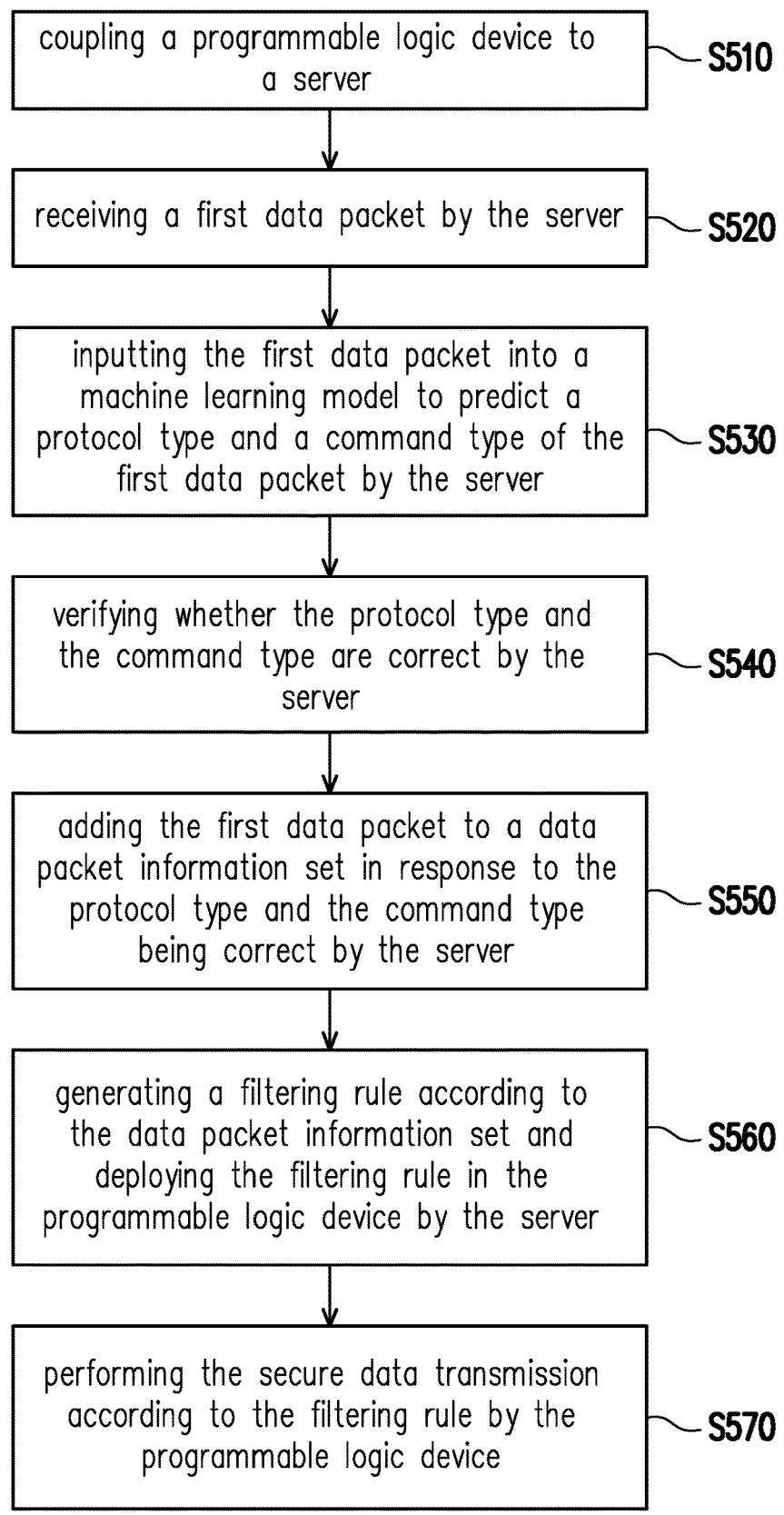
FIG. 5 illustrates a flowchart of a method for secure data transmission according to an embodiment of the disclosure.

FIG. 5 illustrates a flowchart of a method for secure data transmission according to an embodiment of the disclosure, wherein the steps of the flowchart may be implemented by the system 10 as shown in FIG. 1. In step S510, coupling a programmable logic device to a server. In step S520, receiving a first data packet by the server. In step S530, inputting the first data packet into a machine learning model to predict a protocol type and a command type of the first data packet by the server. In step S540, verifying whether the protocol type and the command type are correct by the server. In step S550, adding the first data packet to a data packet information set in response to the protocol type and the command type being correct by the server. In step S560, generating a filtering rule according to the data packet information set and deploying the filtering rule in the programmable logic device by the server. In step S570, performing the secure data transmission according to the filtering rule by the programmable logic device.

In summary, the system of the disclosure may deploy filtering rules on a PLD so as to perform secure data transmission for end devices. Before the filtering rules are created, a gateway of the system may mirror the data packets forwarded to the PLD to a server. The server may use a machine learning model to determine whether a data packet can be utilized for creating filtering rules according to the protocol type and the command type of the data packet. Accordingly, the data packets suitable for the creation of the filtering rules may be collected by the server automatically. After the number of the collected data packets is enough, the system may select a feature representing the collected data packets and create the filtering rules based on the selected feature. The server may deploy the filtering rules on the PLD and the PLD may perform secure data transmission according to the filtering rule. The gateways of the system may convert the communication protocol of the data packet inputted to or outputted from the system. Therefore, the secure data transmission between the end devices can be achieved even if the end devices and the server use different media for data transmission. Based on the above, customized secure data transmission can be implemented easily.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A system for secure data transmission, comprising:
a programmable logic device; and
a server, coupled to the programmable logic device, wherein the server is configured to:
receive a first data packet;
input the first data packet into a machine learning model to predict a protocol type and a command type of the first data packet;
verify whether the protocol type and the command type are correct;
add the first data packet to a data packet information set in response to the protocol type and the command type being correct; and
generate a filtering rule according to the data packet information set and deploy the filtering rule in the programmable logic device, comprising: obtaining, from the data packet information set, a plurality of data packets corresponding to the protocol type and the command type; obtaining, from the plurality of data packets, a plurality of feature values respectively corresponding to the plurality of data packets, wherein the plurality of feature values comprise at least one first feature value and at least one second feature value; selecting, from the at least one first feature value and the at least one second feature value, the at least one first feature value as a selected feature value in response to a first number of the at least one first feature value being greater than a second number of the at least one second feature value; and generating, according to the selected feature value, the filtering rule corresponding to the protocol type and the command type, wherein
the programmable logic device performs the secure data transmission according to the filtering rule.

2. The system of claim 1, wherein the selected feature value comprises at least one of the followings: an Internet protocol address, a media access control address, and a transmission control protocol port number.

3. The system of claim 1, wherein the filtering rule comprises:
discarding a second data packet corresponding to the protocol type and the command type in response to a feature value of the second data packet not matching with the selected feature value.

4. The system of claim 3, further comprising:
a first gateway, coupled to the programmable logic device, wherein the first gateway receives the second data packet and forwards the second data packet to the programmable logic device.

5. The system of claim 4, wherein the first gateway is coupled to the server, wherein the first gateway receives the first data packet and mirrors the first data packet to the server.

6. The system of claim 4, wherein the first gateway converts the first data packet and the second data packet from a first communication protocol to a second communication protocol.

7. The system of claim 6, further comprising:
a second gateway, coupled to the programmable logic device, wherein the second gateway receives a data packet from the programmable logic device via the secure data transmission and converts the data packet from the second communication protocol to the first communication protocol.

8. The system of claim 3, further comprising:
a diagnosis device, coupled to the programmable logic device, wherein the diagnosis device receives the second data packet discarded by the programmable logic device and generates a report according to the second data packet.

9. The system of claim 1, wherein the machine learning model comprises a convolutional neural network.

10. The system of claim 1, wherein the server verifies whether the protocol type and the command type are correct by:
obtaining a first value from a first field in the first data packet, wherein the first field is associated with the protocol type; and
determining the protocol type is correct in response to both the first value and a data length of the first data packet matching with the protocol type.

11. The system of claim 10, wherein the server verifies whether the protocol type and the command type are correct further by:
obtaining a second value from a second field in the first data packet, wherein the second field is associated with the command type corresponding to the protocol type; and
determining the command type is correct in response to the second value matching with the command type.

12. The system of claim 1, wherein the server generates the filtering rule in response to a number of data packets in the data packet information set being greater than a threshold.

13. A method for secure data transmission, comprising:
coupling a programmable logic device to a server;
receiving a first data packet by the server;
inputting the first data packet into a machine learning model to predict a protocol type and a command type of the first data packet by the server;
verifying whether the protocol type and the command type are correct by the server;
adding the first data packet to a data packet information set in response to the protocol type and the command type being correct by the server;
generating a filtering rule according to the data packet information set and deploying the filtering rule in the programmable logic device by the server, comprising: obtaining, from the data packet information set, a plurality of data packets corresponding to the protocol type and the command type; obtaining, from the plurality of data packets, a plurality of feature values respectively corresponding to the plurality of data packets, wherein the plurality of feature values comprise at least one first feature value and at least one second feature value; selecting, from the at least one first feature value and the at least one second feature value, the at least one first feature value as a selected feature value in response to a first number of the at least one first feature value being greater than a second number of the at least one second feature value; and generating, according to the selected feature value, the filtering rule corresponding to the protocol type and the command type; and performing the secure data transmission according to the filtering rule by the programmable logic device.

\* \* \* \* \*